(12) United States Patent
Peuhkurinen

(10) Patent No.: US 11,175,513 B2
(45) Date of Patent: Nov. 16, 2021

(54) DISPLAY APPARATUSES AND METHODS EMPLOYING WAVEGUIDES AND OPACITY MASKS

(71) Applicant: Varjo Technologies Oy, Helsinki (FI)

(72) Inventor: Ari Antti Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/034,124

(22) Filed: Sep. 28, 2020

(65) Prior Publication Data

US 2021/0018754 A1 Jan. 21, 2021

Related U.S. Application Data

(63) Continuation-in-part of application No. 16/778,883, filed on Jan. 31, 2020, now Pat. No. 11,054,658, which is a continuation-in-part of application No. 16/253,954, filed on Jan. 22, 2019, now Pat. No. 10,764,567.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 27/0179* (2013.01); *G02B 2027/014* (2013.01); *G02B 2027/0118* (2013.01); *G02B 2027/0187* (2013.01)

(58) Field of Classification Search
CPC ............ G02B 27/0172; G02B 27/0093; G02B 27/0179
See application file for complete search history.

(56) References Cited

U.S. PATENT DOCUMENTS

| | | | | |
|---|---|---|---|---|
| 2009/0244084 | A1* | 10/2009 | Dammertz | G06T 11/001 345/586 |
| 2015/0078629 | A1* | 3/2015 | Gottemukkula | G06T 11/60 382/117 |
| 2016/0377865 | A1* | 12/2016 | Alexander | G06F 1/163 345/8 |
| 2018/0232048 | A1* | 8/2018 | Popovich | G02F 1/2955 |
| 2018/0275410 | A1* | 9/2018 | Yeoh | G02B 27/0172 |
| 2019/0212560 | A1* | 7/2019 | Sugiyama | G02B 19/0028 |

\* cited by examiner

*Primary Examiner* — Jonathan R Messmore
(74) *Attorney, Agent, or Firm* — Ziegler IP Law Group, LLC

(57) ABSTRACT

A display apparatus including means for detecting user's gaze direction; first light source; second light source; configuration (108, 208, 306) of reflective elements to split light to create copies of second image; optical waveguides whose outlets are arranged in tiled layout; opacity masks arranged at inlets of waveguides; and processor. Input image is processed to generate first and second images. Processor is configured to: display first and second images; and for optical waveguides, control respective opacity masks to block respective copies of second image or selectively allow portions of respective copies of second image to pass through towards inlets of waveguides. Light from first light source is optically combined with light exiting outlets of waveguides, to produce output image.

18 Claims, 7 Drawing Sheets

DISPLAY APPARATUSES AND METHODS EMPLOYING WAVEGUIDES AND OPACITY MASKS

CROSS-REFERENCE TO RELATED APPLICATIONS

This application is a continuation-in-part of U.S. patent application Ser. No. 16/778,883, titled "DISPLAY APPARATUS AND METHOD USING REFLECTIVE ELEMENTS AND OPACITY MASK" and filed on Jan. 31, 2020, which is incorporated herein by reference. Furthermore, the U.S. patent application Ser. No. 16/778,883 is a continuation-in-part of U.S. patent application Ser. No. 16/253,954, titled "DISPLAY APPARATUS AND METHOD OF DISPLAYING" and filed on Jan. 22, 2019, which is also incorporated herein by reference.

TECHNICAL FIELD

The present disclosure relates to display apparatuses employing optical waveguides and opacity masks. Moreover, the present disclosure relates to methods implemented by such display apparatuses.

BACKGROUND

Presently, several extended-reality (XR) technologies are being used to present interactive XR environments to users. Typically, the users utilize specialized XR devices (for example, such as an XR headset, a pair of XR glasses, and the like) for experiencing and interacting with the XR environments. In use, the user generally wears a given XR device on his/her head.

Conventional XR devices employ various equipment in order to present images that constitute the XR environment to the user. Generally, the XR devices display different offset views of the images that constitute the XR environment, via light sources associated with different eyes of the user. The XR devices employ several optical elements to direct projections of these images towards the eyes of the user. It is desired that the XR environment appears realistic and immersive to the user.

However, the conventional XR devices have certain limitations associated therewith. As an example, some XR devices use large high-resolution light sources for displaying the images. These large high-resolution light sources are difficult to manufacture and are generally not available in a small form factor, or when available, they are extremely expensive. Use of such light sources makes such specialized devices very expensive for both consumers, as well as prosumers. As another example, some XR devices employ complex arrangements of moving optical elements, moving light sources, and/or a combination of light sources with fixed optics. Movement of components introduces noise in the XR devices. Dynamically managing such complex arrangements is extremely difficult in practice. Moreover, these complex arrangements also require considerable space to be properly accommodated in the XR devices. This makes the XR devices bulky and cumbersome to use.

Therefore, in light of the foregoing discussion, there exists a need to overcome the aforementioned drawbacks associated with existing XR devices.

SUMMARY

The present disclosure seeks to provide a display apparatus employing optical waveguides and opacity masks. The present disclosure also seeks to provide a method implemented by such a display apparatus. The present disclosure seeks to provide a solution to the existing problems of high component costs and complex component arrangements that are associated with provision of XR environments in conventional XR devices. An aim of the present disclosure is to provide a solution that overcomes at least partially the problems encountered in prior art, and provides a display apparatus that provides immersive XR environments using cost-effective components and using a simple arrangement of components.

In one aspect, an embodiment of the present disclosure provides a display apparatus comprising:

means for detecting a gaze direction of a user with respect to an image plane;

a first light source and a second light source to be employed to display a first image and a second image, respectively;

a configuration of reflective elements arranged to split light emanating from the second light source to create a plurality of copies of the second image displayed at the second light source, wherein at least two reflective elements of said configuration have different reflectance;

a plurality of optical waveguides whose outlets are arranged in a tiled layout and whose inlets correspond to respective copies of the second image;

a plurality of opacity masks arranged at respective inlets of the plurality of optical waveguides; and a processor coupled to said means, the first light source, the second light source and the plurality of opacity masks, wherein the processor or at least one external processor communicably coupled to the processor is configured to process an input image, based on the detected gaze direction of the user, to generate the first image and the second image, and wherein the processor is configured to:

display the first image and the second image simultaneously at the first light source and the second light source, respectively; and for a given optical waveguide, control a respective opacity mask based on the detected gaze direction of the user to block a respective copy of the second image or to selectively allow a given portion of the respective copy of the second image to pass through towards an inlet of the given optical waveguide, wherein light emanating from the first light source is optically combined with light emanating from the outlets of the plurality of optical waveguides, to produce on the image plane an output image to be presented to the user.

In another aspect, an embodiment of the present disclosure provides a method comprising:

detecting a gaze direction of a user with respect to an image plane;

processing an input image, based on the detected gaze direction of the user, to generate a first image and a second image;

displaying the first image and the second image simultaneously at a first light source and a second light source, respectively;

splitting light emanating from the second light source by employing a configuration of reflective elements to create a plurality of copies of the second image displayed at the second light source, at least two reflective elements of said configuration having different reflectance, wherein inlets of a plurality of optical waveguides correspond to respective copies of the second image, outlets of the plurality of optical waveguides are arranged in a tiled layout, and a plurality of opacity masks are arranged at respective inlets of the plurality of optical waveguides;

for a given optical waveguide, controlling a respective opacity mask based on the detected gaze direction of the user to block a respective copy of the second image or to selectively allow a given portion of the respective copy of the second image to pass through towards an inlet of the given optical waveguide; and optically combining light emanating from the first light source with light emanating from the outlets of the plurality of optical waveguides, to produce on the image plane an output image to be presented to the user.

Embodiments of the present disclosure substantially eliminate or at least partially address the aforementioned problems in the prior art, and enable cost-efficient provision of realistic and immersive output images to the user using a display apparatus having a simplified component arrangement.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4C illustrates an exemplary first image, while

Figure 1:
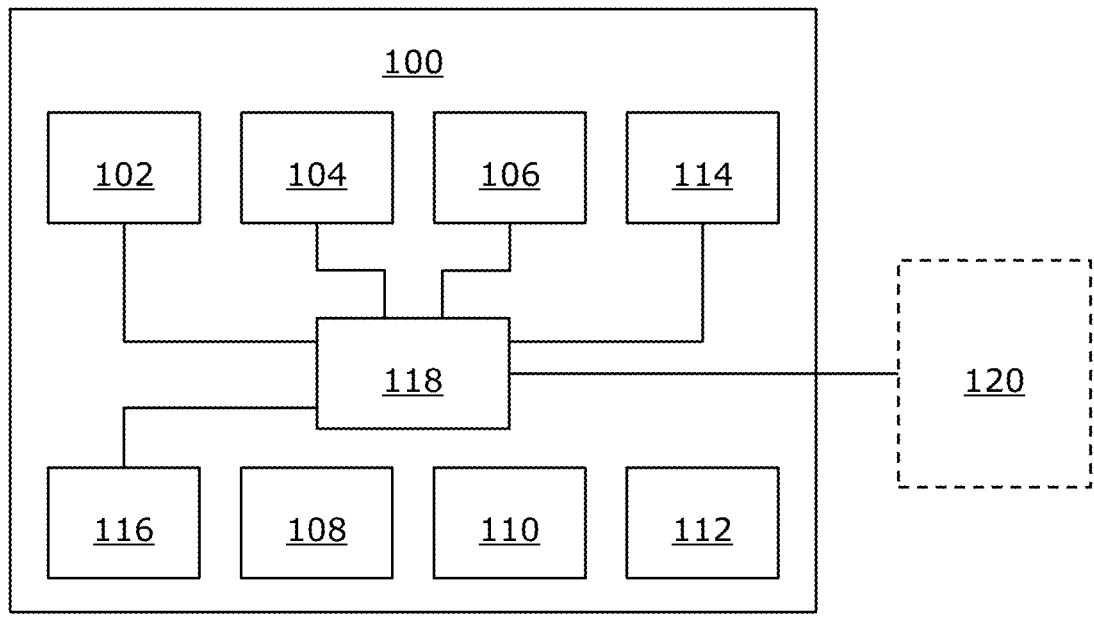
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

means for detecting a gaze direction of a user with respect to an image plane;

a first light source and a second light source to be employed to display a first image and a second image, respectively;

a configuration of reflective elements arranged to split light emanating from the second light source to create a plurality of copies of the second image displayed at the second light source, wherein at least two reflective elements of said configuration have different reflectance;

a plurality of optical waveguides whose outlets are arranged in a tiled layout and whose inlets correspond to respective copies of the second image;

a plurality of opacity masks arranged at respective inlets of the plurality of optical waveguides; and a processor coupled to said means, the first light source, the second light source and the plurality of opacity masks, wherein the processor or at least one external processor communicably coupled to the processor is configured to process an input image, based on the detected gaze direction of the user, to generate the first image and the second image, and wherein the processor is configured to:

display the first image and the second image simultaneously at the first light source and the second light source, respectively; and for a given optical waveguide, control a respective opacity mask based on the detected gaze direction of the user to block a respective copy of the second image or to selectively allow a given portion of the respective copy of the second image to pass through towards an inlet of the given optical waveguide, wherein light emanating from the first light source is optically combined with light emanating from the outlets of the plurality of optical waveguides, to produce on the image plane an output image to be presented to the user.

In another aspect, an embodiment of the present disclosure provides a method comprising:

detecting a gaze direction of a user with respect to an image plane;

processing an input image, based on the detected gaze direction of the user, to generate a first image and a second image;

displaying the first image and the second image simultaneously at a first light source and a second light source, respectively;

splitting light emanating from the second light source by employing a configuration of reflective elements to create a plurality of copies of the second image displayed at the second light source, at least two reflective elements of said configuration having different reflectance, wherein inlets of a plurality of optical waveguides correspond to respective copies of the second image, outlets of the plurality of optical waveguides are arranged in a tiled layout, and a plurality of opacity masks are arranged at respective inlets of the plurality of optical waveguides;

for a given optical waveguide, controlling a respective opacity mask based on the detected gaze direction of the user to block a respective copy of the second image or to selectively allow a given portion of the respective copy of the second image to pass through towards an inlet of the given optical waveguide; and optically combining light emanating from the first light source with light emanating from the outlets of the plurality of optical waveguides, to produce on the image plane an output image to be presented to the user.

In the display apparatus, high-resolution second images are rendered using moderately-priced second light sources having small form factor. Then, the plurality of copies of these second images is formed over a large field of view using the configuration of reflective elements. As a result, the display apparatus efficiently provides these second images without using extremely expensive and large-sized second light sources. Moreover, employing low-resolution first images in combination with the high-resolution second images enables provision of multi-resolution output images to the user. Such output images mimic active foveation characteristics of the human visual system to provide immersive extended-reality environments to the user. These output images are formed over a large field of view, thereby enhancing the user's viewing experience. A position of a high-resolution portion within the multi-resolution output images is accurately adjustable based on the detected gaze direction of the user, by controlling opacity masks to dynamically adjust only current-gaze contingent portions of the plurality of copies of the second image to pass through the optical waveguides towards the user's eyes. Moreover, the arrangement of various components within the display apparatus is quite simple (as no moving components are employed). Therefore, the display apparatus is easy to manufacture, is compact and is user friendly. As the number of moving parts in the display apparatus is extremely limited, the display apparatus has nil or minimal noise.

Throughout the present disclosure, the term "display apparatus" refers to specialized equipment that is configured to present an extended-reality (XR) environment to the user when the display apparatus in operation is worn by the user on his/her head. In such an instance, the display apparatus acts as a device (for example, such as an XR headset, a pair of XR glasses, and the like) that is operable to present a visual scene of the XR environment to the user. Commonly, the "display apparatus" is referred to as "head-mounted display apparatus", for the sake of convenience only.

Throughout the present disclosure, the term "extended-reality" encompasses virtual reality (VR), augmented reality (AR), mixed reality (MR), and the like.

Throughout the present disclosure, the term "means for detecting the gaze direction" refers to specialized equipment for detecting and/or following a direction of gaze of the user, when the display apparatus in operation is worn by the user. Optionally, the means for detecting the gaze direction is implemented by way of contact lenses with sensors, cameras monitoring a position of a pupil of the user's eye, and the like. Such means for detecting the gaze direction are well-known in the art. The processor is configured to receive, from said means, information indicative of the detected gaze direction of the user with respect to the image plane. Herein, the term "image plane" refers to an imaginary plane on which the output image is produced.

Throughout the present disclosure, the term "light source" refers to an element from which light emanates. The display apparatus comprises one first light source and one second light source per eye of the user. Optionally, a given light source is implemented as a display. In this regard, a given XR image is displayed at the given light source. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given light source is implemented as a projector. In this regard, a given XR image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

Throughout the present disclosure, the term "configuration of reflective elements" refers to a set of reflective elements that is arranged to split the light emanating from the second light source into a plurality of directions to produce the plurality of copies of the second image. Optical properties (such as reflectance, transmittance, and the like) and the arrangement of reflective elements of the configuration cause the light emanating from the second light source to be split into the plurality of directions. The configuration of reflective elements serves as a passive light-splitting arrangement. The number of directions into which the light emanating from the second light source is split is fixed. Optionally, the number of directions in the plurality of directions is greater than or equal to two. Optionally, an angle between two adjacent directions depends upon a distance between components of the display apparatus and a required field of view of the display apparatus.

Optionally, the reflective elements of said configuration are implemented by way of at least two of: partially-reflective mirrors, fully-reflective mirrors, partially-reflective lenses, fully-reflective lenses, partially-reflective prisms, fully-reflective prisms.

It will be appreciated that the "plurality of copies of the second image" refers to at least two copies of the second image. In order to produce the least two copies of the second image, at least two reflective elements of said configuration are required to have different reflectance. In an example, when two copies of the second image are to be produced in a 1*2 tiled layout or when four copies of the second image are to be produced in a 2*2 tiled layout, a first reflective element may be implemented as a 50/50 partially-reflective mirror having 50% reflectance and a second reflective element may be implemented as a fully-reflective mirror having 100% reflectance. In another example, when nine copies of the second image are to be produced in a 3*3 tiled layout, a first reflective element may have 33% reflectance, a second reflective element may have 50% reflectance and a third reflective element may have a 100% reflectance.

Figure 3A:
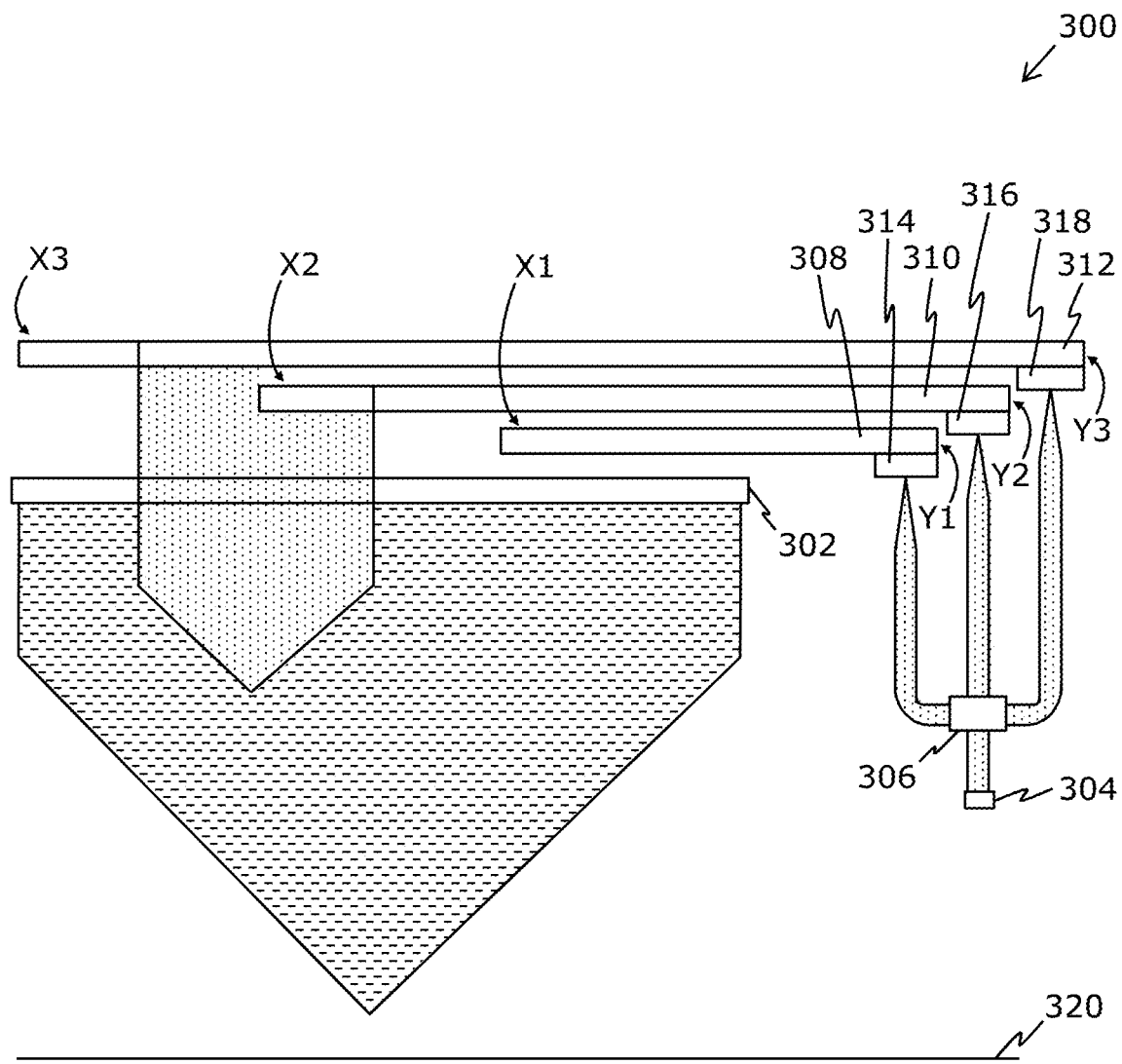
FIGS. 3A and 3B illustrate exemplary implementations of a display apparatus, in accordance with different embodiments of the present disclosure.
Figure 3B:
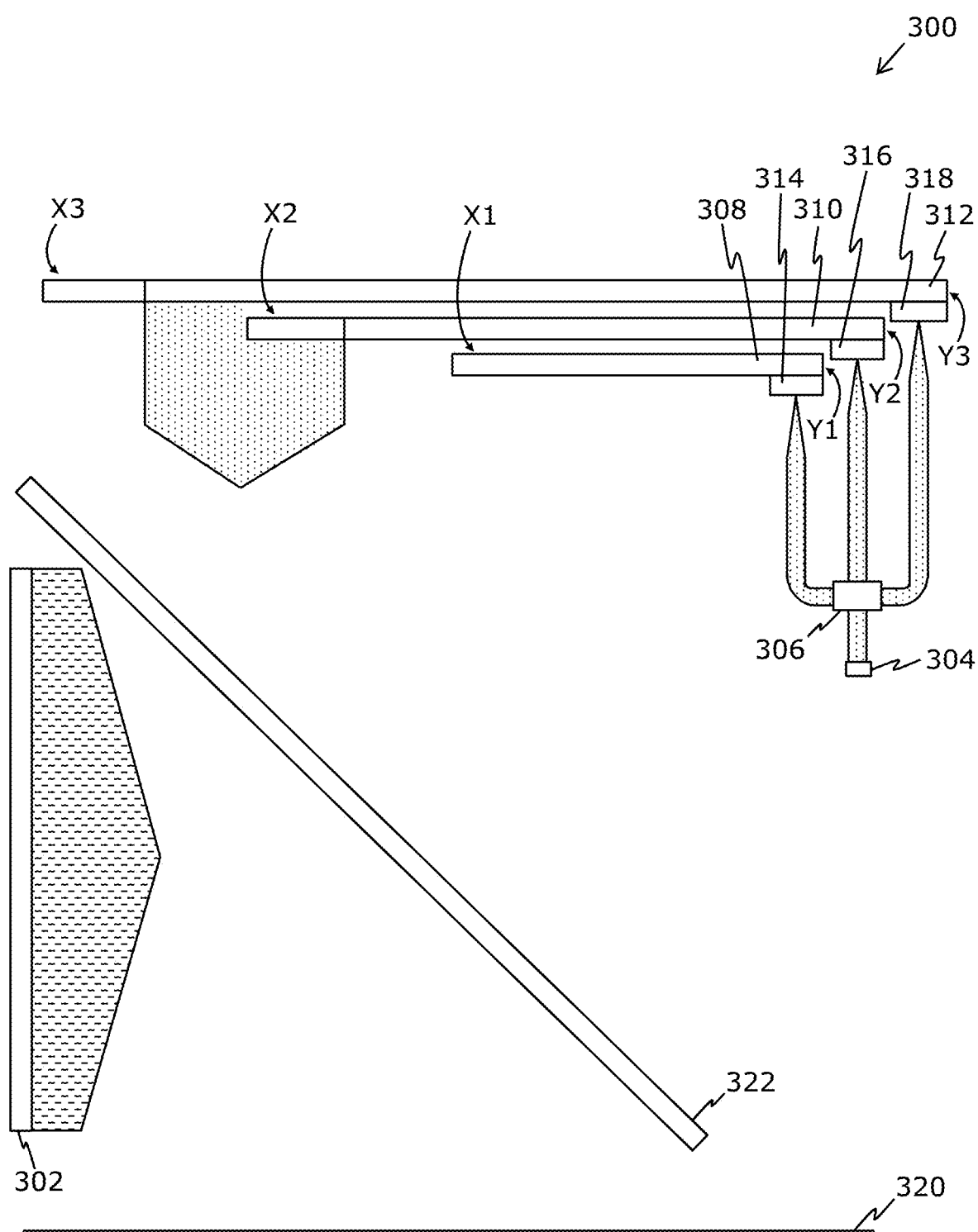

Optionally, the configuration of reflective elements comprises a set of L reflective elements that are arranged in a sequential manner, wherein L is selected from the group consisting of 2, 3, 4 and 5. By the phrase "L reflective elements are arranged in a sequential manner", it is meant that L reflective elements of the set are arranged in a sequence such that light transmitted by an (n−1)th reflective element is incident upon an nth reflective element. As an example, the configuration of reflective elements may comprise a single set of three reflective elements that are arranged in the sequential manner. In such an example, there would be produced three copies of the second image in a 1*3 tiled manner. Such a configuration is employed in the exemplary implementations of the display apparatus that are shown in FIGS. 3A and 3B.

Optionally, the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements. In other words, an nth set of reflective elements from amongst the L sets is arranged on an optical path of light reflected by an nth reflective element of the set of L reflective elements. In an embodiment, M is the same as L. In another embodiment, M is different from L.

In an example, the configuration of reflective elements may comprise a set of three reflective elements X1, X2, and X3 that are arranged in the sequential manner. Said configuration may further comprise three sets S1, S2, and S3 of 2, 3, and 2 reflective elements, respectively. In the three sets S1-S3, reflective elements of each set may be arranged in the sequential manner. In such an example, the set S1 may be arranged on an optical path of light reflected by the reflective element X1, the set S2 may be arranged on an optical path of light reflected by the reflective element X2, and the set S3 may be arranged on an optical path of light reflected by the reflective element X3. In such a case, there would be produced seven copies of the second image in a 2-3-2 tiled layout (namely, a first row including two copies, a second row including three copies, and a third row including two copies).

Optionally, for a given set of N reflective elements, a first reflective element of the given set has a reflectance of $1/N$, a second reflective element of the given set has a reflectance of $1/(N-1)$, an $N-1$th reflective element of the given set has a reflectance of $½$, and an $N^{th}$ reflective element of the given set has a reflectance of 1. A given reflective element having a specific reflectance reflects that specific proportion of intensity of light incident thereupon, in a given direction. Such values of reflectance of sequentially arranged reflective elements allow for equal intensities of light to be reflected from each reflective element.

As an example, for a given set of four reflective elements R1, R2, R3, and R4 arranged in the same sequence, the reflective elements R1, R2, R3, and R4 have reflectances of $¼$, $⅓$, $½$, and 1. This means that the reflective element R1 reflects $¼$th of an intensity Z of light incident thereupon towards a first direction and transmits $¾$th of the intensity Z of the light towards the reflective element R2. Then, the reflective element R2 reflects $⅓$rd of the intensity $0.75*Z$ of the light incident thereupon towards a second direction and transmits $⅔$rds of the intensity $0.75*Z$ of the light towards the reflective element R3. Then, the reflective element R3 reflects $½$ of the intensity $0.5*Z$ of the light incident thereupon towards a third direction and transmits $½$ of the intensity $0.5*Z$ of the light towards the reflective element R4. The reflective element R4 reflects whole of the intensity $0.25*Z$ of the light incident thereupon towards a fourth direction. In this way, each of the four reflective elements R1-R4 reflect one-fourth of the original intensity Z of the light incident upon the reflective element R1 therefrom.

Throughout the present disclosure, the term "optical waveguide" refers to an optical element which guides light. The given optical waveguide is designed to steer (namely, direct) the light entering the inlet of the given optical waveguide in a manner that said light exits from the outlet of the given optical waveguide. In this way, the given optical waveguide controls an optical path of light entering therein.

It will be appreciated that the plurality of optical waveguides are arranged in a layered manner, wherein one or more optical waveguides are arranged in one or more layers. Each of the one or more layers lies in a separate plane. Moreover, the plurality of optical waveguides collectively constitute a single waveguide unit having a layered implementation.

Optionally, the given optical waveguide is implemented as at least one of: an optical fiber, a dielectric waveguide.

Optionally, each of the plurality of optical waveguides is transparent. Alternatively, optionally, each of the plurality of optical waveguides is semi-transparent.

Optionally, the plurality of optical waveguides are arranged to face the user's eyes. In such a case, when each of the plurality of optical waveguides is transparent or semi-transparent, the user is able to view light emanating from behind the plurality of optical waveguides. Said light may be the light emanating from the first light source, light emanating from a real-world environment, or similar.

In some implementations, the first light source is arranged behind the plurality of optical waveguides. In other implementations, the first light source is arranged in front of the plurality of optical waveguides. In yet other implementations, the first light source is arranged in a plane that lies at an angle from planes of the plurality of optical waveguides. In still other implementations, the first light source is arranged in one of the planes of the plurality of optical waveguides.

It will also be appreciated that as the outlets of the plurality of optical waveguides are arranged in the tiled layout, adjacent outlets have no gap therebetween. Moreover, the adjacent outlets have no overlap therebetween. However, practically, the adjacent outlets may have minimal overlap or gap therebetween due to build tolerances.

In an embodiment, the tiled layout is a rectangular tiled layout. In the rectangular tiled layout, the outlets of the plurality of optical waveguides are arranged in rows and columns in a layered manner such that an overall shape of said arrangement of the outlets is rectangular. In an example, three outlets of three optical waveguides may be arranged in a 1*3 rectangular tiled layout. One such tiled layout has been illustrated in FIGS. 3A and 3B. In another example, six outlets of six optical waveguides may be arranged in a 2*3 rectangular tiled layout.

In another embodiment, the tiled layout is a hexagonal tiled layout. In the hexagonal tiled layout, the outlets of the plurality of optical waveguides are arranged in a manner that an overall shape of said arrangement is hexagonal (for example, honeycomb-like). In an example, seven outlets of seven optical waveguides may be arranged in a 2-3-2 hexagonal tiled layout. Notably, a first row of the tiled layout may include two outlets, a second row of the tiled layout may include three outlets, and a third row of the tiled layout may include two outlets. The first, second, and third rows may be aligned in a hexagonal shape across three layers. The hexagonal tiled layout is preferred over the rectangular tiled layout in cases where the output image to be produced has a circular shape, as a hexagon closely better approximates the shape of a circle as compared to a rectangle. Optionally, the tiled layout is a circular tiled layout, an elliptical tiled layout, and the like.

Throughout the present disclosure, the term "opacity mask" refers to an element that controls passage of light through itself. A given opacity mask is controllable to either completely block or to selectively pass light through itself. When selectively passing light through itself, the given opacity mask passes a given portion of the light and blocks a remaining portion of the light. The plurality of opacity masks are controllable to control light that is passed from the configuration of reflective elements into the plurality of optical waveguides. The processor controls the plurality of opacity masks, to allow only that portion of the plurality of copies of the second image which corresponds to a region of the image plane at which the user's gaze is directed, to pass through said opacity masks towards the inlets of the plurality of optical waveguides. The remaining portion of the plurality of copies of the second image is blocked by the plurality of opacity masks and is not passed towards the inlets of the plurality of optical waveguides. In the absence of the plurality of optical masks, an entirety of the plurality of copies of the second image would have entered the inlets of said waveguides and exited from the outlets of said waveguides in the tiled layout.

It will be appreciated that the gaze direction of the user with respect to the image plane would keep changing as the user views the visual scene. Accordingly, the portion of the plurality of copies of the second image that is to be passed through the plurality of opacity masks would also keep changing. In some implementations, said portion of the plurality of copies of the second image corresponds to a single copy of the second image, whereas in other implementations, said portion of the plurality of copies of the second image corresponds to portions of at least two copies of the second image.

Optionally, a given opacity mask is implemented by way of a spatial light modulator. Optionally, in this regard, the spatial light modulator is an electrically addressable spatial light modulator. Notably, the processor is configured to control the spatial light modulator by way of an electrical control signal, to allow or block passage of light through the spatial light modulator. Examples of the spatial light modulator include, but are not limited to, a Digital Micromirror Device®, a Liquid Crystal on Silicon (LCoS)-based display, a Ferroelectric Liquid Crystal on Silicon (FLCoS)-based display, and a nematic liquid crystal-based display.

Alternatively, optionally, a given opacity mask is implemented by way of a Liquid Crystal (LC) shutter matrix. The LC shutter matrix comprises a plurality of LCDs which are controllable to toggle between an open state and a closed state by application of a control signal. In the open state, a given LCD is transparent and allows light to pass therethrough. Alternatively, in the closed state, the given LCD is opaque and blocks light from passing therethrough.

Throughout the present disclosure, the term "external processor" refers to a processor that is implemented as a processor of an external computing device. The at least one external processor is communicably coupled to the processor wirelessly and/or in a wired manner. It will be appreciated that performing, at the at least one external processor, at least some computational tasks associated with image processing is beneficial, as it would considerably reduce processing burden on the processor of the display apparatus.

Optionally, the processor is configured to obtain the input image from an image source that is communicably coupled to the processor. Optionally, the image source comprises at least one of: a camera, a computer.

The input image serves as an input for generating the first and second images, which are subsequently used to produce the output image. The input image is not shown to the user, whereas the output image is shown to the user. Herein, the term "second image" refers to an image that corresponds to a region of interest within the input image, whereas the term "first image" refers to an image that corresponds to at least a remaining region of the input image or a portion of the remaining region that is different from the region of interest. Herein, the term "region of interest" refers to a region in the input image which corresponds to the user's gaze.

Optionally, an angular width of the region of interest lies in a range of 5 degrees to 60 degrees. Therefore, an angular width of the second image lies in a range of 5 degrees to 60 degrees. For example, the angular width of the region of interest may be from 5, 10, 15, 20, 25, 30, 35, 40, 45, 50 or 55 degrees up to 10, 15, 20, 25, 30, 35, 40, 45, 50, 55 or 60 degrees. Optionally, an angular width of the first image lies in a range of 40 degrees to 220 degrees. For example, the angular width of the first image may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Herein, the term "angular width" refers to an angular width of a given image or its region with respect to the perspective of the user's eye, namely with respect to a centre of the user's gaze.

In an embodiment, the first image represents only that remaining region of the input image or that portion of the remaining region which is different from the region of interest. Optionally, in this regard, the first image is generated by cropping the remaining region of the input image excluding the region of interest or a portion of the remaining region that is different from the region of interest. In another embodiment, the first image represents an entirety of the input image. Optionally, the first image is generated by magnifying the input image. Optionally, a region of the first image that corresponds to the region of interest in the input image is masked (for example, by blackening corresponding pixels).

Optionally, the first image and the second image have different angular resolutions. Moreover, optionally, the first image has a first angular resolution, while the second image has a second angular resolution, the second angular resolution being higher than the first angular resolution. In such a case, the configuration of reflective elements allows for providing high-resolution second images across a large field of view without requiring expensive large high-resolution image sources. Employing multiple angular resolutions in this manner enables saving of computational resources, since the higher second angular resolution is only employed for the second image which corresponds to the gaze direction of the user.

The first image and the second image are displayed simultaneously at the first light source and the second light source, respectively, to allow for producing the output image as a whole, in a manner that the user views a complete output image instead of two separate images. Upon displaying the first image, light emanates from the first light source. Such light is a projection of the first image. Likewise, upon displaying the second image, light emanates from the second light source. Such light is a projection of the second image.

Optionally, the processor is configured to determine, based on the detected gaze direction of the user, a region of the image plane at which the user's gaze is directed, wherein, when controlling the respective opacity mask, the processor is configured to:

detect, based on the region of the image plane at which the user's gaze is directed and a position of an outlet of the given optical waveguide in the tiled layout, whether the respective copy of the second image is to be blocked entirely or partially;

when it is detected that the respective copy of the second image is to be blocked entirely, control the respective opacity mask to block the respective copy of the second image;

when it is detected that the respective copy of the second image is to be blocked partially, determine the given portion of the respective copy of the second image that is to be selectively allowed to passed through towards the inlet of the given optical waveguide and control the respective opacity mask to selectively allow the given portion of the respective copy of the second image to pass through towards the inlet of the given optical waveguide, whilst blocking a remaining portion of the respective copy of the second image.

In this way, individual opacity masks are electrically controlled by the processor to adjust light entering the plurality of optical waveguides. A technical benefit of arranging the opacity masks at the inlets of the optical waveguides and electrically controlling the opacity masks is that passage of only requisite light through the optical waveguides is performed using a simple arrangement of non-moving, non-bulky components within the display apparatus.

Optionally, the region of the image plane at which the user's gaze is directed is determined by mapping the detected gaze direction of the user onto the image plane.

Optionally, when a position of the region of the image plane at which the user's gaze is directed in the image plane does not correspond to a position of the outlet of the given optical waveguide in the tiled layout, it is detected that the respective copy of the second image is to be blocked entirely. Alternatively, optionally, when a position of the region of the image plane at which the user's gaze is directed in the image plane corresponds partially to the position of the outlet of the given optical waveguide in the tiled layout, it is detected that the respective copy of the second image is to be blocked partially.

Optionally, a portion of the respective copy of the second image which, when allowed to pass through the inlet, would be incident upon the region of the image plane at which the user's gaze is directed, is determined to be the given portion of the respective copy of the second image that is to be selectively allowed to pass through towards the inlet of the given optical waveguide.

The "output image" is an image that is produced on the image plane. Notably, the output image is visible to the user. Optionally, when the first image and the second image have different angular resolutions, the output image has a spatially-variable angular resolution. By "spatially-variable angular resolution", it is meant that angular resolution of the output image varies spatially across the image plane. Herein, the "angular resolution" (or simply, "resolution") of a given image or its portion refers to a number of pixels per degree (namely, points per degree (PPD)) of an angular width of the given image or its portion, wherein the angular width is measured from the perspective of the user's eye.

Optionally, the output image comprises a first region and a second region, wherein an angular resolution of the second region is greater than an angular resolution of the first region. Beneficially, the angular resolution of the second region is comparable to a normal human-eye resolution. Therefore, the output image having the spatially-variable angular resolution mimics foveation characteristics of the human visual system. As the output image is generated dynamically according to the detected gaze direction of the user, the display apparatus emulates active foveation characteristics of the human visual system.

Optionally, the angular resolution of the second region of the output image is greater than or equal to twice the angular resolution of the first region of the output image. As an example, in the output image, the angular resolution of the second region may be approximately 90 pixels per degree, while the angular resolution of the first region may be approximately 15 pixels per degree.

Optionally, the light emanating from the first light source produces the first region of the output image, whereas the light emanating from the outlets of the plurality of optical waveguides produces the second region of the output image. Optionally, in this regard, the second region is produced upon the region of the image plane at which the user's gaze is directed, whereas the first region is produced upon at least a remaining region or a portion of the remaining region of the image plane.

According to an embodiment, the processor or the at least one external processor is configured to determine, based on the detected gaze direction of the user, a region of interest within the input image and a region of the image plane at which the user's gaze is directed, wherein, when generating the second image, the processor or the at least one external processor is configured to:

crop a portion of the input image that includes the region of interest;

pad the cropped portion of the input image to generate an intermediate image; and divide the intermediate image into a plurality of portions and reorganize the plurality of portions to generate the second image, based on the region of the image plane at which the user's gaze is directed.

Such a manner of generating the second image is employed when the position of the region of the image plane at which the user's gaze is directed in the image plane does not correspond exactly to a position of a given outlet of a given optical waveguide in the tiled layout. In other words, such a manner of generating the second image is employed when portions of at least two copies of the second image that exit from at least two outlets of at least two optical waveguides would be incident upon the region of the image plane at which the user's gaze is directed.

In such a case, the portions of the at least two copies of the second image would represent the second image in a jumbled (namely, disordered) form. As a result, at the image plane, the second region of the output image would be produced in a muddled-up form that is different from the way the second image was displayed at the second light source. Therefore, in such a case, the second image is generated in the aforesaid manner (described in more detail hereinbelow) to ensure that the second region of the output image is produced in a required ordered from.

Optionally, the portion of the input image that includes the region of interest is cropped, in order to include the region of interest in the second image. The term "intermediate image" refers to an image that represents the cropped portion of the input image and its corresponding padding. The intermediate image is not shown to the user and is generated merely to enable generation of the second image. Beneficially, the padding operation compensates for loss of image content when the light emanating from the second light source is directed towards the image plane. Moreover, padding the cropped portion could also help in maintaining features of the cropped portion. Image padding techniques are well known in the art.

Optionally, a number of portions into which the intermediate image is divided is equal to a number of portions of the at least two copies of the second image that would be incident on the region of the image plane at which the user's gaze is directed. Then, the plurality of portions of the intermediate image are reorganized to correct their order. The step of dividing and reorganizing is performed in a manner that the portions of the at least two copies of the second image are accurately representative of the region of interest.

Optionally, when generating the second image, the processor or the at least one external processor is configured to:

divide the intermediate image into two portions when the gaze direction corresponds to a region of the image plane whereat two portions of two copies among the plurality of copies of the second image would be incident, and swap positions of the two portions; or divide the intermediate image into four portions when the gaze direction of the user corresponds to a region of the image plane whereat four portions of four copies among the plurality of copies of the second image would be incident, and diagonally swap positions of the four portions.

According to another embodiment, the processor or the at least one external processor is configured to determine, based upon the detected gaze direction of the user, a region of interest within the input image and a region of the image plane at which the user's gaze is directed,
wherein, when generating the second image, the processor or the at least one external processor is configured to:

crop a portion of the input image that includes the region of interest; and pad the cropped portion of the input image to generate the second image.

Such a manner of generating the second image is employed when the position of the region of the image plane at which the user's gaze is directed in the image plane corresponds exactly to a position of a given outlet of a given optical waveguide in the tiled layout. In such a case, a copy of the second image exiting the given outlet of the given optical waveguide would represent the second image in the same form as the form in which the second image is displayed. As a result, at the image plane, the second region of the output image would be produced in the same form as the displayed second image.

Optionally, the display apparatus further comprises an optical combiner arranged to optically combine the light emanating from the first light source with the light emanating from the outlets of the plurality of optical waveguides. Herein, the term "optical combiner" refers to at least one optical element for optically combining the light emanating from the first light source with the light emanating from the outlets of the plurality of optical waveguides. Upon optical combination of the aforesaid lights, the output image is produced on the image plane.

Optionally, in this regard, the first light source and the outlets of the plurality of optical waveguides are mutually arranged to enable optical see-through. In such a case, the plurality of optical waveguides are arranged to face the user's eyes, whereas the first light source is arranged in another plane that is perpendicular with respect to planes of the plurality of optical waveguides. A technical effect of this is that when the second light source is switched off or dimmed, the plurality of optical waveguides (being transparent) will allow light emanating from a real-world environment at which the user is present to pass through. The optical combiner also facilitates provision of this optical see-through experience to the user as it passes the light emanating from the real-world environment to pass through.

In this way, the optical see-through is enabled along with active foveated rendering, without requiring big, moving or noisy components.

Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer.

The present disclosure also relates to the method as described above. Various embodiments and variants disclosed above apply mutatis mutandis to the method.

In an embodiment, the tiled layout is a rectangular tiled layout. In another embodiment, the tiled layout is a hexagonal tiled layout.

Optionally, the method further comprises determining, based on the detected gaze direction of the user, a region of the image plane at which the user's gaze is directed,
wherein the step of controlling the respective opacity mask comprises:

detecting, based on the region of the image plane at which the user's gaze is directed and a position of an outlet of the given optical waveguide in the tiled layout, whether the respective copy of the second image is to be blocked entirely or partially;

when it is detected that the respective copy of the second image is to be blocked entirely, controlling the respective opacity mask to block the respective copy of the second image;

when it is detected that the respective copy of the second image is to be blocked partially, determining the given portion of the respective copy of the second image that is to be selectively allowed to passed through towards the inlet of the given optical waveguide and controlling the respective opacity mask to selectively allow the given portion of the respective copy of the second image to pass through towards the inlet of the given optical waveguide, whilst blocking a remaining portion of the respective copy of the second image.

Optionally, the method further comprises determining, based on the detected gaze direction of the user, a region of interest within the input image and a region of the image plane at which the user's gaze is directed,
wherein the step of generating the second image comprises:

cropping a portion of the input image that includes the region of interest;

padding the cropped portion of the input image to generate an intermediate image; and dividing the intermediate image into a plurality of portions and reorganizing the plurality of portions to generate the second image, based on the region of the image plane at which the user's gaze is directed.

Optionally, the configuration of reflective elements comprises a set of L reflective elements that are arranged in a sequential manner, wherein L is selected from the group consisting of 2, 3, 4 and 5.

Optionally, the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

Optionally, for a given set of N reflective elements, a first reflective element of the given set has a reflectance of 1/N, a second reflective element of the given set has a reflectance of 1/(N−1), an N−1th reflective element of the given set has a reflectance of ½, and an $N^{th}$ reflective element of the given set has a reflectance of 1.

Optionally, the step of optically combining is performed by employing an optical combiner.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises means 102 for detecting a gaze direction of a user with respect to an image plane, a first light source 104 and a second light source 106, a configuration 108 of reflective elements, a plurality of optical waveguides (depicted as optical waveguides 110 and 112), a plurality of opacity masks (depicted as opacity masks 114 and 116), and a processor 118. The processor 118 is coupled to said means 102, the first light source 104, the second light source 106 and the plurality of opacity masks 114 and 116. The processor 118 is also coupled to at least one external processor (depicted as an external processor 120).

Figure 2:
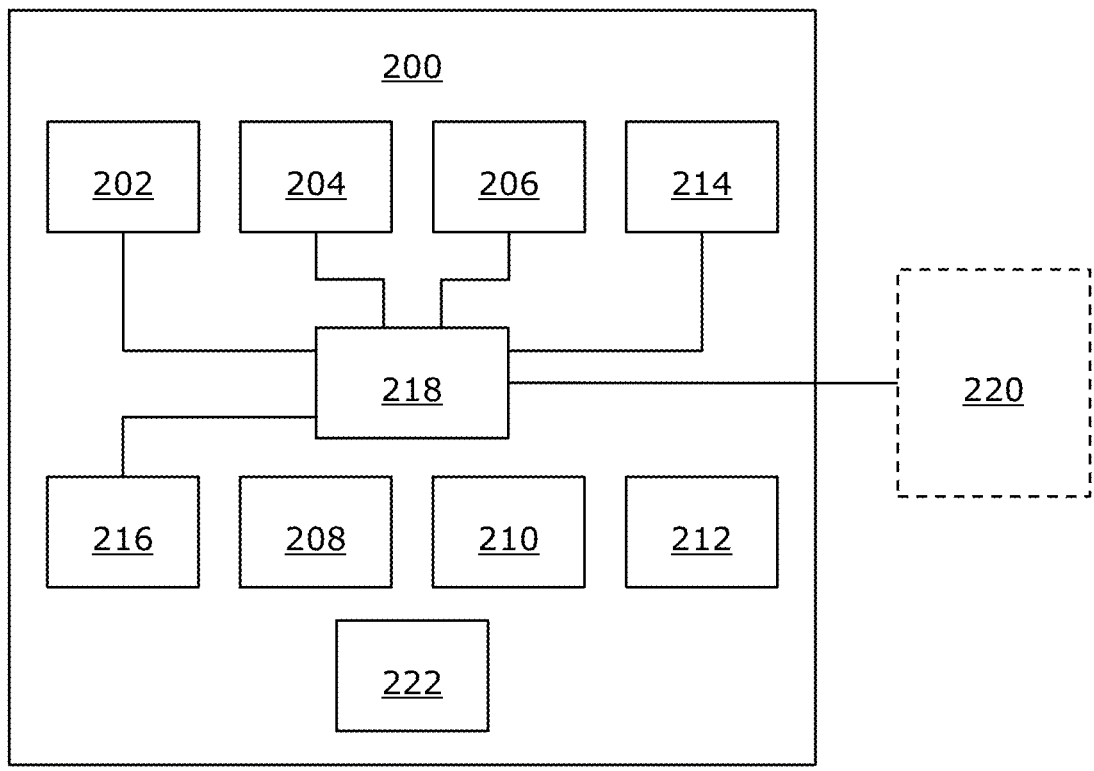

Referring to FIG. 2, illustrated is a block diagram of architecture of a display apparatus 200, in accordance with an embodiment of the present disclosure. The display apparatus 200 comprises means 202 for detecting a gaze direction of a user with respect to an image plane, a first light source 204 and a second light source 206, a configuration 208 of reflective elements, a plurality of optical waveguides (depicted as optical waveguides 210 and 212), a plurality of opacity masks (depicted as opacity masks 214 and 216), and a processor 218. There is also shown at least one external processor (depicted as an external processor 220) communicably coupled to the processor 218. The display apparatus 200 further comprises an optical combiner 222 arranged to optically combine light emanating from the first light source 204 with light emanating from outlets of the plurality of optical waveguides 210 and 212.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Referring to FIGS. 3A and 3B, illustrated are exemplary implementations of a display apparatus 300, in accordance with different embodiments of the present disclosure. In FIGS. 3A and 3B, the display apparatus 300 is shown to include a first light source 302, a second light source 304, a configuration 306 of reflective elements, three optical waveguides (depicted as optical waveguides 308, 310, and 312), and three opacity masks (depicted as opacity masks 314, 316, and 318). Outlets X1, X2, and X3 of the optical waveguides 308, 310, and 312, respectively, are arranged in a rectangular tiled layout. The three opacity masks 314, 316, and 318 are arranged at inlets Y1, Y2, and Y3 of the three optical waveguides 308, 310, and 312, respectively.

A first image and a second image are displayed simultaneously at the first light source 302 and the second light source 304, respectively. The configuration 306 of reflective elements is arranged to split light emanating from the second light source 304 to create three copies of the second image displayed at the second light source 304. The three inlets Y1, Y2, and Y3 of the optical waveguides 308, 310, and 312, respectively, correspond to respective copies of the second image. For a given optical waveguide, a respective opacity mask is controlled based on the detected gaze direction of a user to block a respective copy of the second image or to selectively allow a given portion of the respective copy of the second image to pass through towards an inlet of the given optical waveguide. As an example, for the optical waveguide 308, its respective opacity mask 314 may be controlled to block its respective copy of the second image. However, for the optical waveguides 310 and 312, their respective opacity masks 316 and 318 may be controlled to selectively allow certain portions of their respective copies of the second image to pass through towards the inlets Y1 and Y2 of the optical waveguides 310 and 312. Light (depicted as a hyphened hatch) emanating from the first light source 302 is optically combined with light (depicted as a dotted hatch) emanating from the outlets X2, and X3 of the plurality of optical waveguides 310 and 312, to produce on an image plane 320 an output image (not shown) to be presented to the user.

In FIG. 3A, the first light source 302 is arranged in a plane that is parallel to planes of the plurality of optical waveguides 308, 310, and 312. Herein, the first light source 302 is shown to be arranged in front of the plurality of optical waveguides 308, 310, and 312.

In FIG. 3B, the first light source 302 is arranged in a plane that is perpendicular with respect to the planes of the plurality of optical waveguides 308, 310, and 312. In FIG. 3B, the display apparatus 300 also comprises an optical combiner 322 arranged to optically combine the light emanating from the first light source 302 with the light emanating from the outlets X2, and X3 of the plurality of optical waveguides 310 and 312. In this implementation, the light emanating from the first light source 302 is reflected from the optical combiner 322 towards the image plane 320, while the light emanating from the outlets X2, and X3 of the plurality of optical waveguides 310 and 312 passes through the optical combiner 322 towards the image plane. This implementation of the display apparatus 300 also enables optical see-through.

It may be understood by a person skilled in the art that the FIGS. 3A and 3B are merely examples for sake of clarity, which should not unduly limit the scope of the claims herein. The person skilled in the art will recognize many variations, alternatives, and modifications of embodiments of the present disclosure. For example, the first light source 302 may be arranged behind the plurality of optical waveguides 308, 310, and 312.

Figure 4A:
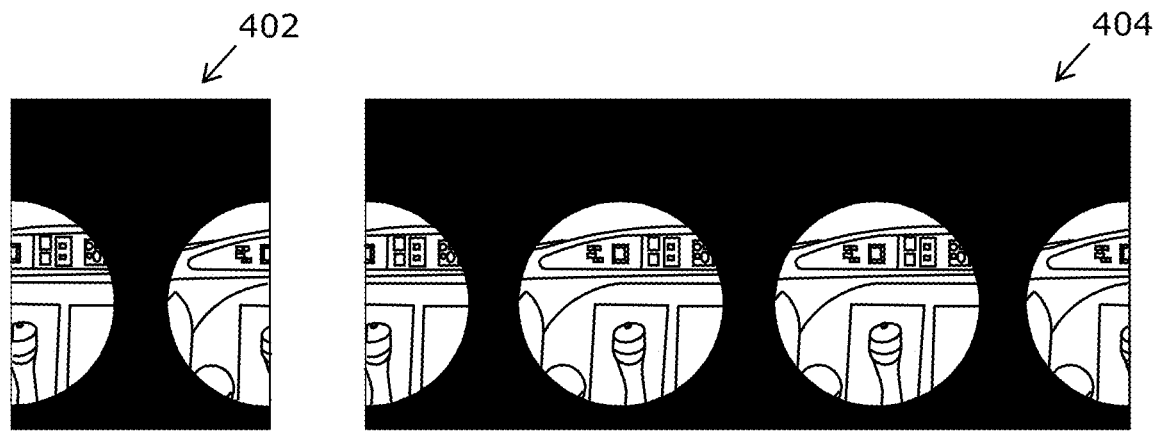
FIG. 4A illustrates an exemplary second image and a tiled layout of three copies of the second image.
Figure 4B:
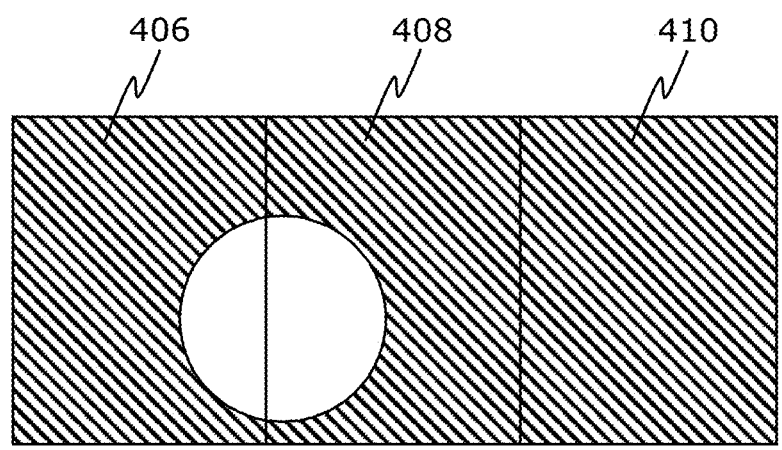
FIG. 4B illustrates three opacity masks.
Figure 4C:
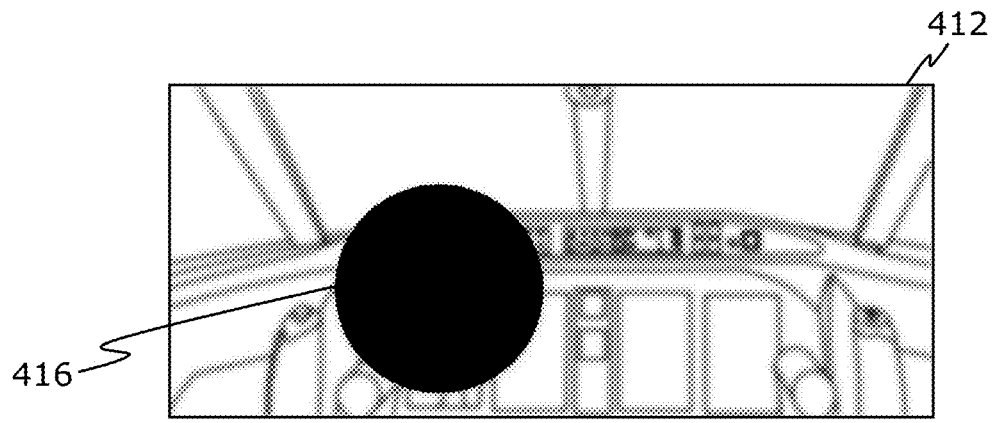
Figure 4D:
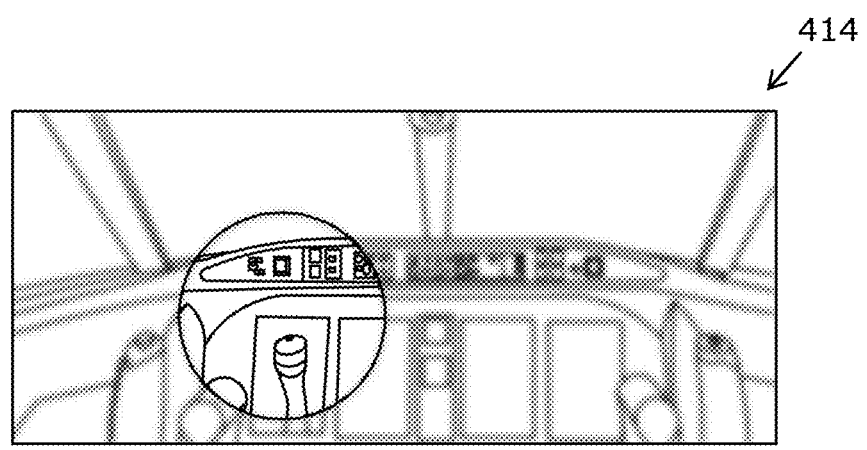
FIG. 4D illustrates an exemplary output image, in accordance with an embodiment of the present disclosure.

Referring to FIGS. 4A, 4B, 4C, and 4D, FIG. 4A illustrates an exemplary second image 402 and a tiled layout 404 of three copies of the second image 402, FIG. 4B illustrates three opacity masks 406, 408, and 410, FIG. 4C illustrates an exemplary first image 412, while FIG. 4D illustrates an exemplary output image 414, in accordance with an embodiment of the present disclosure.

In FIG. 4A, there is shown the exemplary second image 402. The second image 402 is generated by cropping a circular portion of an input image (not shown) that includes a region of interest within the input image, padding the cropped portion of the input image to generate an intermediate image (not shown), and dividing the intermediate image into two portions and reorganizing the two portions to generate the second image 402, based on a region of an image plane (not shown) at which a user's gaze is directed. The tiled layout 404 is a 1*3 non-overlapping layout of three copies of the second image 402.

In FIG. 4B, there are shown three opacity masks 406, 408, and 410 corresponding to the three copies of the second image 402. The three opacity masks 406, 408, and 410 are separate from each other and have been illustrated in a tiled manner (corresponding to the tiled layout 404), for sake of convenience only. Notably, white portions of the opacity masks 406 and 408 allow therethrough passage of corresponding portions of their respective copies of the second image 402. Hatched portions of the three opacity masks 406, 408, and 410 block corresponding portions of their respective copies of the second image 402.

In FIG. 4C, the exemplary first image 412 is shown to exclude a region of interest in the input image. A portion 416 of the first image 412 corresponding to the region of interest is masked (for example, by blackening pixels).

In FIG. 4D, the exemplary output image 414 is shown to include portions corresponding to both the first image 412 and the second image 402. The output image 414 is produced by optically combining the first image 412 and the second image 402.

Figure 5A:
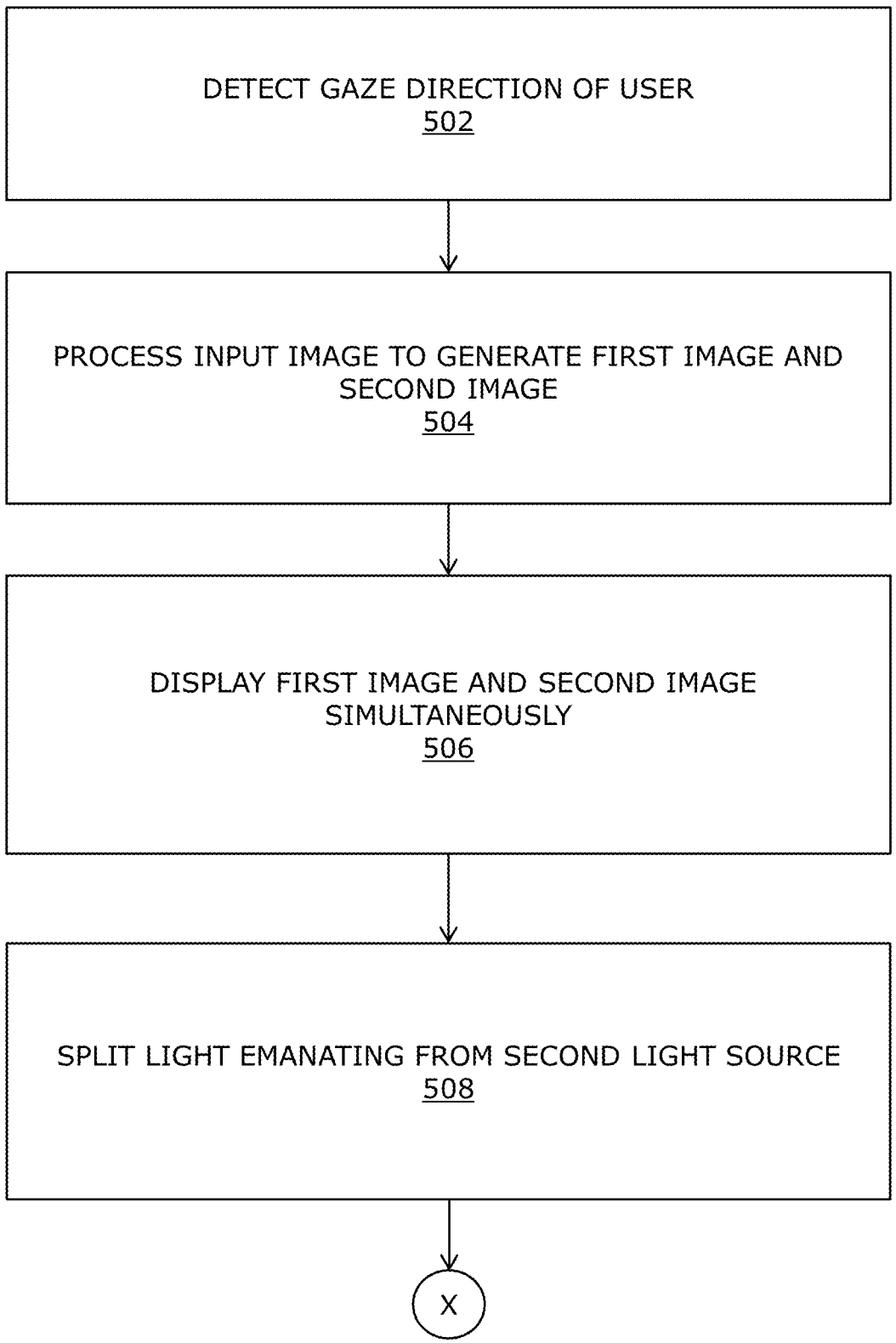
FIGS. 5A and 5B illustrate steps of a method, in accordance with an embodiment of the present disclosure.
Figure 5B:
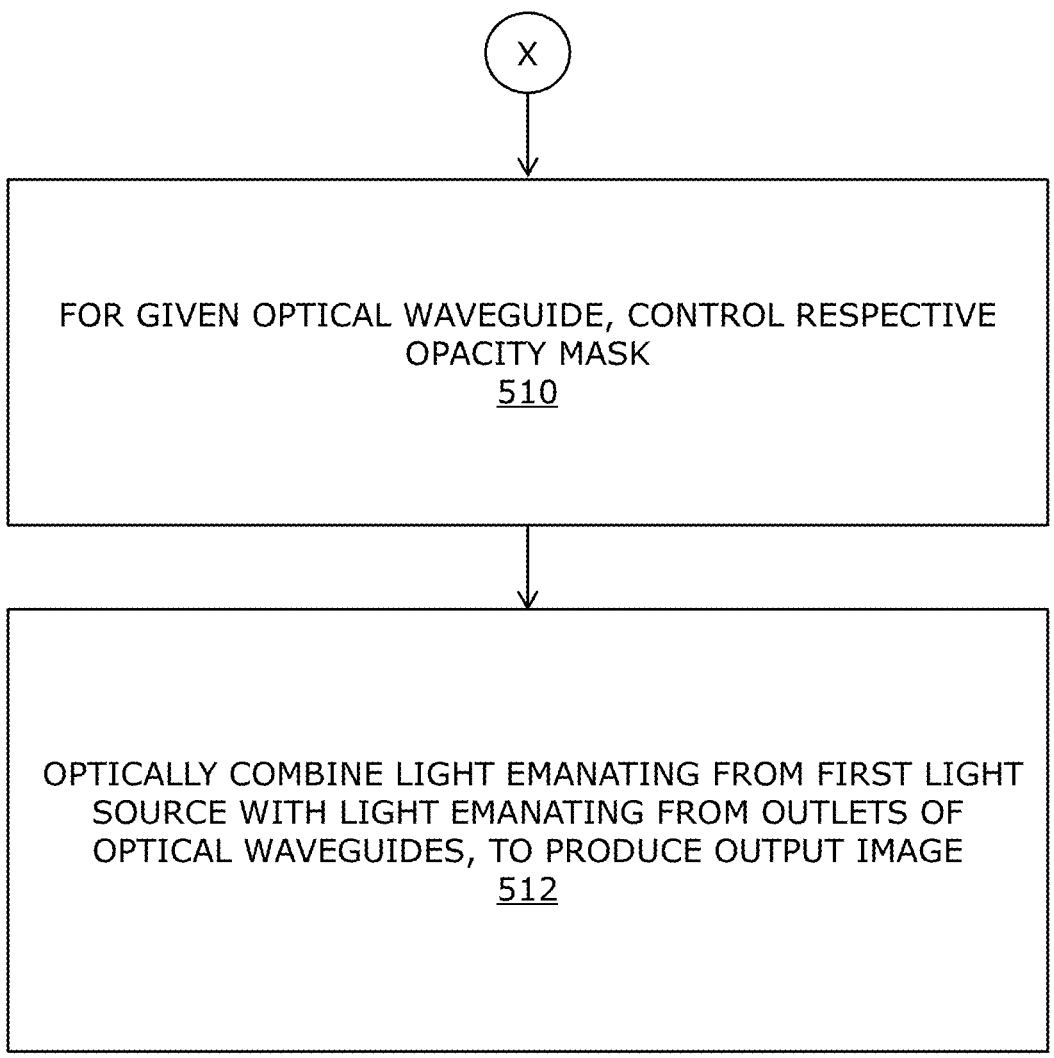

Referring to FIGS. 5A and 5B, illustrated are steps of a method, in accordance with an embodiment of the present disclosure. At step 502, a gaze direction of a user with respect to an image plane is detected. At step 504, an input image is processed, based on the detected gaze direction of the user, to generate a first image and a second image. At step 506, the first image and the second image are displayed simultaneously at a first light source and a second light source, respectively. At step 508, light emanating from the second light source is split by employing a configuration of reflective elements to create a plurality of copies of the second image displayed at the second light source. At least two reflective elements of said configuration have different reflectance. Inlets of a plurality of optical waveguides correspond to respective copies of the second image. Outlets of the plurality of optical waveguides are arranged in a tiled layout. A plurality of opacity masks are arranged at respective inlets of the plurality of optical waveguides. At step 510, for a given optical waveguide, a respective opacity mask is controlled based on the detected gaze direction of the user to block a respective copy of the second image or to selectively allow a given portion of the respective copy of the second image to pass through towards an inlet of the given optical waveguide. At step 512, light emanating from the first light source is optically combined with light emanating from the outlets of the plurality of optical waveguides, to produce on the image plane an output image to be presented to the user.

The steps 502, 504, 506, 508, 510 and 512 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
    means for detecting a gaze direction of a user with respect to an image plane;
    a first light source and a second light source to be employed to display a first image and a second image, respectively;
    a configuration of reflective elements arranged to split light emanating from the second light source to create a plurality of copies of the second image displayed at the second light source, wherein at least two reflective elements of said configuration have different reflectance;
    a plurality of optical waveguides whose outlets are arranged in a tiled layout and whose inlets correspond to respective copies of the second image;
    a plurality of opacity masks arranged at respective inlets of the plurality of optical waveguides; and
    a processor coupled to said means, the first light source, the second light source and the plurality of opacity masks, wherein the processor or at least one external processor communicably coupled to the processor is configured to process an input image, based on the detected gaze direction of the user, to generate the first image and the second image, and wherein the processor is configured to:
        display the first image and the second image simultaneously at the first light source and the second light source, respectively; and
        for a given optical waveguide, control a respective opacity mask based on the detected gaze direction of the user to block a respective copy of the second image or to selectively allow a given portion of the respective copy of the second image to pass through towards an inlet of the given optical waveguide,
    wherein light emanating from the first light source is optically combined with light emanating from the outlets of the plurality of optical waveguides, to produce on the image plane an output image to be presented to the user.

2. The display apparatus of claim 1, wherein the tiled layout is a rectangular tiled layout.

3. The display apparatus of claim 1, wherein the tiled layout is a hexagonal tiled layout.

4. The display apparatus of claim 1, wherein the processor is configured to determine, based on the detected gaze direction of the user, a region of the image plane at which the user's gaze is directed,
wherein, when controlling the respective opacity mask the processor is configured to:
    detect, based on the region of the image plane at which the user's gaze is directed and a position of an outlet of the given optical waveguide in the tiled layout, whether the respective copy of the second image is to be blocked entirely or partially;
    when it is detected that the respective copy of the second image is to be blocked entirely, control the respective opacity mask to block the respective copy of the second image;
    when it is detected that the respective copy of the second image is to be blocked partially, determine the given portion of the respective copy of the second image that is to be selectively allowed to passed through towards the inlet of the given optical waveguide and control the respective opacity mask to selectively allow the given portion of the respective copy of the second image to pass through towards the inlet of the given optical waveguide, whilst blocking a remaining portion of the respective copy of the second image.

5. The display apparatus of claim 1, wherein the processor or the at least one external processor is configured to determine, based on the detected gaze direction of the user, a region of interest within the input image and a region of the image plane at which the user's gaze is directed, wherein, when generating the second image, the processor or the at least one external processor is configured to:
crop a portion of the input image that includes the region of interest;
pad the cropped portion of the input image to generate an intermediate image; and
divide the intermediate image into a plurality of portions and reorganize the plurality of portions to generate the second image, based on the region of the image plane at which the user's gaze is directed.

6. The display apparatus of claim 1, wherein the configuration of reflective elements comprises a set of L reflective elements that are arranged in a sequential manner, wherein L is selected from the group consisting of 2, 3, 4 and 5.

7. The display apparatus of claim 6, wherein the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

8. The display apparatus of claim 6, wherein for a given set of N reflective elements, a first reflective element of the given set has a reflectance of $1/N$, a second reflective element of the given set has a reflectance of $1/(N-1)$, an $N-1^{th}$ reflective element of the given set has a reflectance of $\frac{1}{2}$, and an $N^{th}$ reflective element of the given set has a reflectance of 1.

9. The display apparatus of claim 1, further comprising an optical combiner arranged to optically combine the light emanating from the first light source with the light emanating from the outlets of the plurality of optical waveguides.

10. A method comprising:
detecting a gaze direction of a user with respect to an image plane;
processing an input image, based on the detected gaze direction of the user, to generate a first image and a second image;
displaying the first image and the second image simultaneously at a first light source and a second light source, respectively;
splitting light emanating from the second light source by employing a configuration of reflective elements to create a plurality of copies of the second image displayed at the second light source, at least two reflective elements of said configuration having different reflectance, wherein inlets of a plurality of optical waveguides correspond to respective copies of the second image, outlets of the plurality of optical waveguides are arranged in a tiled layout, and a plurality of opacity masks are arranged at respective inlets of the plurality of optical waveguides;
for a given optical waveguide, controlling a respective opacity mask based on the detected gaze direction of the user to block a respective copy of the second image or to selectively allow a given portion of the respective copy of the second image to pass through towards an inlet of the given optical waveguide; and
optically combining light emanating from the first light source with light emanating from the outlets of the plurality of optical waveguides, to produce on the image plane an output image to be presented to the user.

11. The method of claim 10, wherein the tiled layout is a rectangular tiled layout.

12. The method of claim 10, wherein the tiled layout is a hexagonal tiled layout.

13. The method of claim 10, further comprising determining, based on the detected gaze direction of the user, a region of the image plane at which the user's gaze is directed,
wherein the step of controlling the respective opacity mask comprises:
detecting, based on the region of the image plane at which the user's gaze is directed and a position of an outlet of the given optical waveguide in the tiled layout, whether the respective copy of the second image is to be blocked entirely or partially;
when it is detected that the respective copy of the second image is to be blocked entirely, controlling the respective opacity mask to block the respective copy of the second image;
when it is detected that the respective copy of the second image is to be blocked partially, determining the given portion of the respective copy of the second image that is to be selectively allowed to passed through towards the inlet of the given optical waveguide and controlling the respective opacity mask to selectively allow the given portion of the respective copy of the second image to pass through towards the inlet of the given optical waveguide, whilst blocking a remaining portion of the respective copy of the second image.

14. The method of claim 10, further comprising determining, based on the detected gaze direction of the user, a region of interest within the input image and a region of the image plane at which the user's gaze is directed,
wherein the step of generating the second image comprises:
cropping a portion of the input image that includes the region of interest;
padding the cropped portion of the input image to generate an intermediate image; and
dividing the intermediate image into a plurality of portions and reorganizing the plurality of portions to generate the second image, based on the region of the image plane at which the user's gaze is directed.

15. The method of claim 10, wherein the configuration of reflective elements comprises a set of L reflective elements that are arranged in a sequential manner, wherein L is selected from the group consisting of 2, 3, 4 and 5.

16. The method of claim 15, wherein the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

17. The method of claim 15, wherein for a given set of N reflective elements, a first reflective element of the given set has a reflectance of $1/N$, a second reflective element of the given set has a reflectance of $1/(N-1)$, an $N-1^{th}$ reflective element of the given set has a reflectance of $\frac{1}{2}$, and an $N^{th}$ reflective element of the given set has a reflectance of 1.

18. The method of claim 10, wherein the step of optically combining is performed by employing an optical combiner.

* * * * *